United States Patent
Kobayashi et al.

(10) Patent No.: US 11,766,983 B2
(45) Date of Patent: Sep. 26, 2023

(54) SIDE AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/756,105

(22) PCT Filed: Oct. 1, 2020

(86) PCT No.: PCT/JP2020/037403
§ 371 (c)(1),
(2) Date: May 17, 2022

(87) PCT Pub. No.: WO2021/100335
PCT Pub. Date: May 27, 2021

(65) Prior Publication Data
US 2022/0402455 A1 Dec. 22, 2022

(30) Foreign Application Priority Data
Nov. 20, 2019 (JP) .................................. 2019-209528

(51) Int. Cl.
*B60R 21/2165* (2011.01)
*B60R 21/207* (2006.01)
(Continued)

(52) U.S. Cl.
CPC ........ *B60R 21/2165* (2013.01); *B60R 21/207* (2013.01); *B60R 21/237* (2013.01);
(Continued)

(58) Field of Classification Search
CPC ................ B60R 21/207; B60R 21/237; B60R 21/23138; B60R 21/2165; B60R 2021/23146
See application file for complete search history.

(56) References Cited

U.S. PATENT DOCUMENTS 10,766,450 B2 * 9/2020 Hatakeyama ......... B60R 21/237
11,066,034 B2 * 7/2021 Heigl ................... B60R 21/2334
(Continued)

FOREIGN PATENT DOCUMENTS

JP 2017-94933 A 6/2017
WO 2018/105324 A1 6/2018
(Continued)

*Primary Examiner* — Faye M Fleming
(74) *Attorney, Agent, or Firm* — Harness, Dickey & Pierce, P.L.C.; Stephen T. Olson

(57) ABSTRACT

An airbag cushion including a cushion rear portion on the inner side of a frame side plate part, a cushion folded portion folded to the outer side of the frame side plate part, and a cushion front portion on the outer side of the frame side plate part. A cover enveloping portion of a cover member has a first end portion engaged with the cushion rear portion and a second end portion that covers a front surface of the cushion folded portion to the cushion front portion and is engaged with a back surface of the cushion folded portion. A cover extension portion connected to the cover enveloping portion by a joint portion and is engaged with the frame side plate part. The cover enveloping portion or the cover extension portion is provided with a weak portion (breakable).

17 Claims, 9 Drawing Sheets

(51) Int. Cl.
*B60R 21/231* (2011.01)
*B60R 21/237* (2006.01)
(52) U.S. Cl.
CPC ............... *B60R 21/23138* (2013.01); *B60R 2021/23146* (2013.01)

(56) References Cited

U.S. PATENT DOCUMENTS

| | | | |
|---|---|---|---|
| 11,104,287 B2 * | 8/2021 | Kobayashi | B60R 21/207 |
| 11,214,223 B2 * | 1/2022 | Kobayashi | B60R 21/217 |
| 2017/0001594 A1 * | 1/2017 | Hatakeyama | B60R 21/231 |

FOREIGN PATENT DOCUMENTS

| | | | | |
|---|---|---|---|---|
| WO | 2018/105335 A1 | 6/2018 | | |
| WO | WO-2018105335 A1 * | 6/2018 | ........... | B60R 21/207 |
| WO | 2018/228831 A1 | 12/2018 | | |

* cited by examiner

A-A

SIDE AIRBAG DEVICE

TECHNICAL FIELD

The present invention relates to a side airbag device mounted on a vehicle.

BACKGROUND TECHNOLOGY

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure.

There are various types of airbag devices depending on the installation site and application. For example, a front airbag device is provided in a center of a steering wheel in order to protect a driver from a collision in a front-back direction. In addition, a curtain airbag device is provided in the vicinity of a ceiling above a side window, and a side airbag device is provided on a side part of a seat to protect an occupant from an impact in a vehicle width direction due to a side collision or the like.

An airbag cushion of a typical airbag device is stored in various sites of a vehicle in a wound or folded storing form. For example, patent Document 1 discloses technology related to an airbag module 16 of a side airbag device. An airbag module 18 has a structure in which an airbag 30 is enveloped in a flap portion 38, and that is attached to a frame 22 of a seatback 12 of a vehicle seat. The flap portion 38 is configured to break along a weak portion 37 based on the expansion pressure of the airbag 30.

PRIOR ART DOCUMENTS

Patent Documents

[Patent Document 1] Japanese Unexamined Patent Application 2012-0175924

SUMMARY OF THE INVENTION

Problem to be Solved by the Invention

Currently, there is demand for further improvement in occupant restraining performance of airbag cushions of side airbag devices. Examples of measures to improve occupant restraining performance include securing support for the airbag cushion, for example. However, the airbag cushion of a side airbag device is often provided at the edge of a vehicle seat seatback and in a lot of cases there is only a soft member such as urethane material on the side opposite the occupant. In addition, the side airbag device must be stowed efficiently in the limited space inside the vehicle seat and efforts must be made to enable smooth opening of a cover member such as the flap portion 38 of Patent Document 1.

In light of the these problems, an object of the present invention is to provide a side airbag device that improves occupant restraining performance and that can be efficiently stowed inside a vehicle seat.

Means for Solving the Problems

To resolve the problems described above, a side airbag device according to the present invention includes: an airbag module assembled on the frame side plate part along the side surface of the seatback of the internal frame of a vehicle seat, wherein, the airbag module includes: an airbag cushion that is bag-shaped and can be assembled to the frame side plate part in a prescribed stowed form of being rolled or folded, an inflator inserted into a prescribed position of the airbag cushion in the stowed form, and a cover member that envelops a prescribed range of the airbag cushion in the stowed form and can be broken by expansion pressure of the airbag cushion; the airbag cushion in stowed form includes: a cushion rear portion that contains the inflator and is assembled on the inside in the width direction of the seatback of the frame side plate part, a cushion folded portion that extends from the cushion rear portion and is folded over the front edge of the frame side plate part and back to the outside of the frame side plate part, and a cushion front portion extending from the cushion folded portion and arranged outside the frame side plate part, and the cover member on the horizontal cross-section of the airbag module assembled to the frame side plate part includes: a cover enveloping portion with a first end portion engaged to the cushion rear portion covering from the inside in the width direction of this cushion rear portion over the front surface of the cushion folded portion and to the periphery in the width direction of the cushion front portion, and a second end portion reaching the back surface of the cushion folded portion and engaged with this back surface, a cover extension portion connected to a region of the cover enveloping portion that covers the cushion front portion by means of a prescribed joint portion, protrudes from this joint portion, and is engaged with the frame side plate part, and one or a plurality of weak portions provided on the cover enveloping portion or cover extension portion and can be broken by expansion pressure.

The airbag cushion described above is arranged on the inside and outside of the frame side plate part. Therefore, with the configuration described above, the airbag cushion can be stowed efficiently in the limited space inside the seatback. In addition, expansion and deployment of the airbag cushion described above starts from the cushion rear portion on the inside of the frame side plate part. Thus, a reaction force from the frame side plate part toward the occupant side is quickly obtained improving restraining force of the occupant. Furthermore, the cover member described above enables suitably retaining the airbag cushion in stowed form and smooth release of the airbag cushion through breaking of one or a plurality of weak portions.

The one or a plurality of weak portions may include a first weak portion provided in a region between a first end portion of the cover enveloping portion and the joint portion. Breaking of the first weak portion in this configuration enables the cover member to smoothly release the airbag cushion.

The first weak portion may be provided near the joint portion. This configuration also enables smooth release of the airbag cushion.

The first weak portion may be provided at a location positioned to the front of the airbag cushion in stowed form when the airbag module is assembled to the frame side plate part. This configuration also enables smooth release of the airbag cushion.

The one or a plurality of weak portions described above may include a second weak portion provided in a region of the cover enveloping portion between the joint portion and a second end portion. Breaking of the second weak portion in this configuration also enables smooth release of the airbag cushion.

The second weak portion can be formed by means of temporary stitching of a second end portion of the cover enveloping portion to a back surface of the cushion folded portion that can be opened by expansion pressure. This configuration enables a suitable implementation of the second weak portion that can be broken by expansion pressure.

The second end portion of the cover enveloping portion described above can be joined to the back surface of the cushion folded portion. Joining of the second end portion of the cover enveloping portion to the cushion folded portion and providing the aforementioned second weak portion between this second end portion and the cover extension portion enables smooth release of the airbag cushion.

The one or a plurality of weak portions described above may include a third weak portion that is formed on the cover extension portion, is broken by expansion pressure, and separates the cover enveloping portion from the frame side plate part. Providing the third weak portion also enables smooth release of the airbag cushion.

The cover extension portion described above may be hooked on the stud bolt of the inflator that penetrate through the frame side plate part. With this configuration, the cover member can easily be fastened to the frame side plate part.

The airbag cushion in stowed form described above may further include a cushion exposed portion that is formed at a prescribed location from the cushion rear portion to the cushion front portion, is exposed through the cover member, and is in contact with the frame side plate part.

The cushion exposed portion described above enables the airbag cushion in stowed form to be in contact with the frame side plate part from prior to breaking of the weak portions of the cover member, in other words, prior to expansion and deployment. Therefore, the airbag cushion obtains a reaction force from the frame side plate part early on during expansion and deployment enabling improving occupant restraining force.

The cover enveloping portion may cover the airbag cushion from top to bottom, the cushion rear portion, the cushion folded portion, and the cushion front portion. This enables the cover enveloping portion to uniformly cover all locations of the airbag cushion from top to bottom; therefore, the load applied by the cover enveloping portion on the airbag cushion upon expansion and deployment thereof is also substantially uniform, and this reduces expansion and deployment behavioral bias of the airbag cushion.

Effect of the Invention

The present invention enables providing a side airbag device that improves occupant restraining performance and can be efficiently stowed inside a vehicle seat.

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1A:
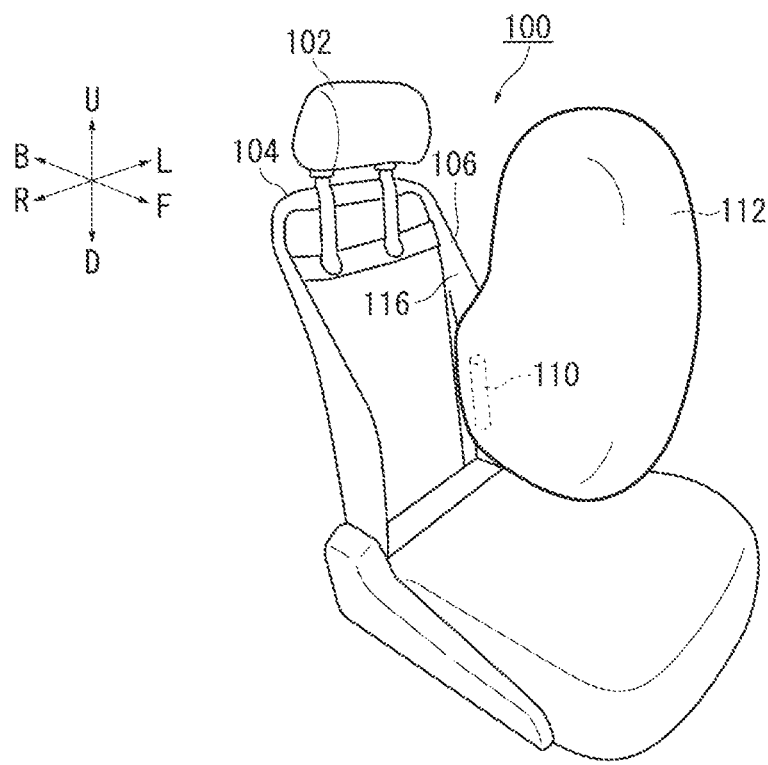
FIG. 1 is a diagram illustrating a side airbag device according to an embodiment of the present invention.

FIG. 1 is a diagram illustrating a side airbag device 100 according to an embodiment of the present invention. FIG. 1(a) illustrates the airbag cushion 112 in an activated state. FIG. 1(a) illustrates from the right side in the vehicle width direction and to the front of the vehicle, the side airbag device 100 and a seat 102 for a vehicle to which the side airbag device 100 is applied. Furthermore, the front-back direction with respect to the seat 102 is appropriately indicated by arrows F (Forward) and B (Back), respectively, the left-right is indicated by arrows L (Left) and R (Right), respectively, and the up-down direction is indicated by arrows U (Up) and D (Down), respectively.

In FIG. 1(a), the upholstery or seat pad (for example, urethane material) of the seatback 104 of the seat 102 is omitted, and only an internal frame 106 is illustrated. The internal frame 106 is a member that is a skeleton built into the seatback 104. Note, the seat 102 is assumed to be arranged on the left side in the front row. However, the side airbag device 100 can be provided in any seat, in the front row, in the back row, and even on either left or right side of the vehicle. Furthermore, the seat 102 normally faces the front of the vehicle, but can also assumed to rotate to face the rear. Therefore, the directions indicated by arrows in each diagram are not intended to be limited to the front-back and left-right directions relative to the vehicle, but rather the front direction is "front" and a back side direction is "back" as viewed from an occupant regularly seated in the seat 102. Similarly, a right hand direction of the occupant at this time is "right" and a left hand direction is "left". Furthermore, with regard to the center of the body of the occupant at this time, a direction toward the head is "up" and a direction toward the leg is "down."

The side airbag device 100 uses the airbag cushion 112 to restrain an occupant seated on the seat 102 from the side in an emergency such as when an impact occurs on the vehicle. The airbag cushion 112 is a bag-shaped member for capturing an occupant and is formed by overlapping, stitching, and otherwise adhering a plurality of base materials included on the surface thereof or weaving using OPW (one piece woven).

An inflator 110 is a gas generating device that operates upon receiving an activation signal transmitted from the vehicle side when an impact occurs, and supplies gas to the inside of the airbag cushion 112. In the present embodiment, the inflator 110 used is a cylinder type. The inflator 110 is equipped on the rear side of the inside of the airbag cushion 112 with the longitudinal direction thereof facing up and down.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types can be used for the inflator 110.

Figure 1B:
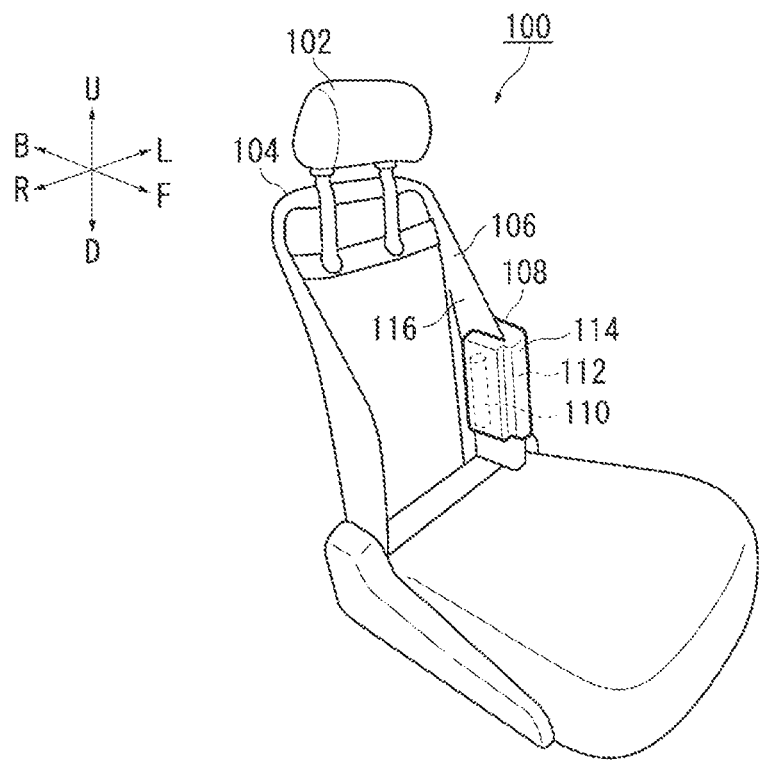

FIG. 1(b) is a diagram illustrating the state before activation of the airbag cushion 112 of FIG. 1(a). The airbag cushion 112 prior to activation is equipped in the seatback 104 of the seat 102 in a stowed form such as by rolling or folding. The airbag cushion 112 is packaged as an airbag module 108 by inserting the inflator 110 and wrapping with a cover member 114.

The airbag module 106 is assembled to a frame side plate part 116 of the internal frame 106. The frame side plate part 116 is a portion of the internal frame 106 along the left and right side surfaces of the seatback 104. The frame side plate part 116 is provided in pairs on the left and right sides in the vehicle width direction. In the present embodiment, the airbag module 106 is assembled to the frame side plate part 116 on the left side in the vehicle width direction. Note that the airbag module 106 can also be assembled to the frame side plate part on the right side in the vehicle width direction. In other words, the airbag module 106 can be provided either on a side part on a door side (near side) of the seat 102 that is closer to a collision point, or on a side part on an vehicle inner side (far side) of the seat 102 that is farther from the collision point.

The airbag module 106 includes the cover member 114 that covers the airbag cushion 112 in stowed form. The cover member 114 is made of non-woven fabric or the like, encloses the airbag cushion 112 in a stowed form, breaks due to expansion pressure of the airbag cushion 112, and releases the airbag cushion 112.

Figure 2A:
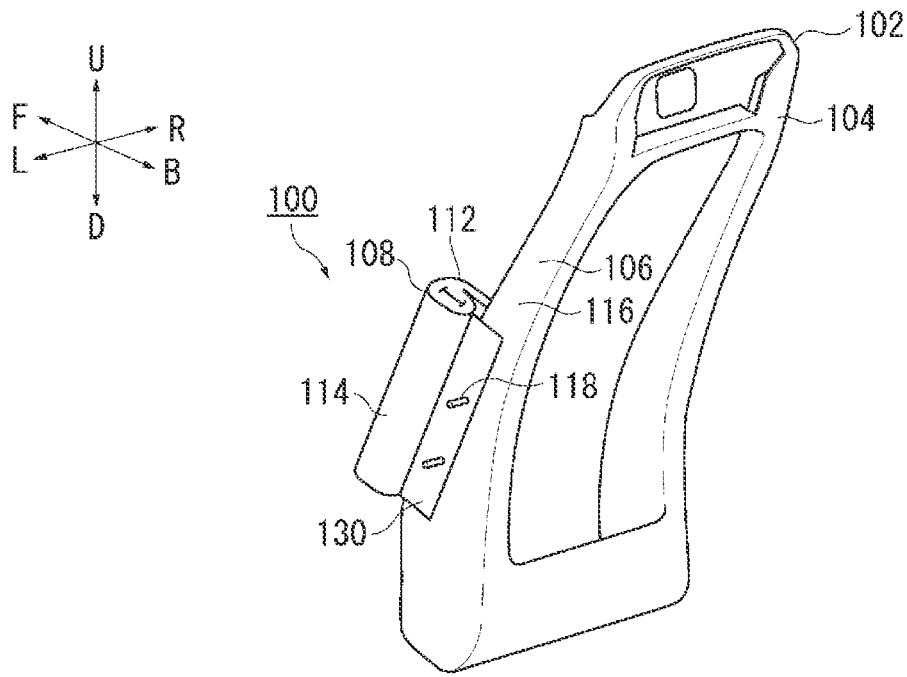
FIG. 2 is a diagram illustrating the side airbag device in FIG. 1(b) from the rear of the vehicle.

FIG. 2 is a diagram illustrating the side airbag device 100 in FIG. 1(b) from the rear of the vehicle. FIG. 2(a) illustrates the side airbag device 100 of FIG. 1(b) from the upper left rear side of the seat 102. The airbag cushion 112 in the stowed form has a vertically long shape along the frame side plate part 116.

Figure 5A:
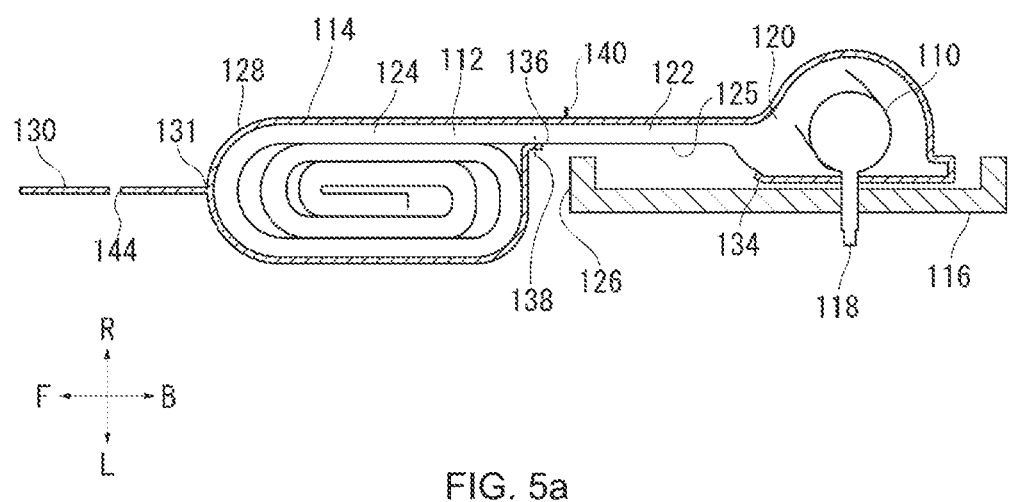
FIG. 5 is a diagram illustrating a process of assembling the airbag module in FIG. 4(b) to the frame side plate part.
Figure 5B:
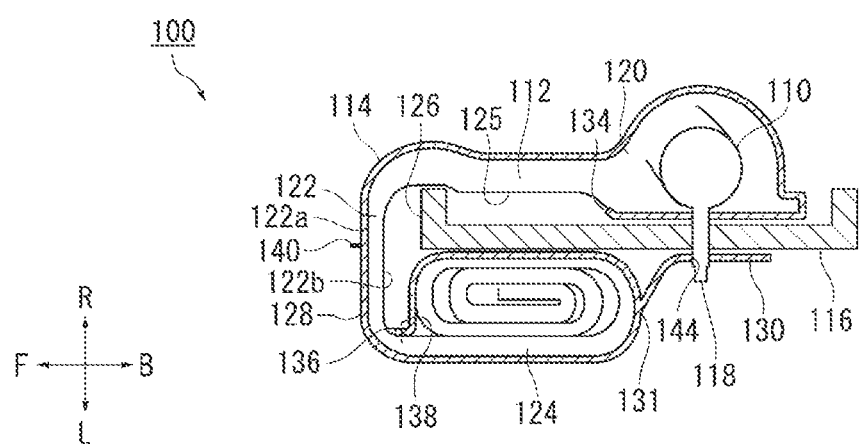

The airbag module 108 is assembled to the frame side plate part 116 using the stud bolt 118 of the inflator 110 (see FIG. 5(b)). The inflator 110 is inserted into the cushion rear portion 120 described below and attached to the frame side plate part 116 with the main body thereof positioned inside the seat 102 in the width direction. A plurality of stud bolt 118 protrude from the main body of the inflator 110, and the inflator 110 is secured by fastening the stud bolt 118 to the frame side plate part 116. Here, the tip end of the stud bolt 118 extends through the outside of the frame side plate part 116, and a cover extension portion 130 of the cover member 114 is hooked and fastened to this tip end side.

Figure 2B:
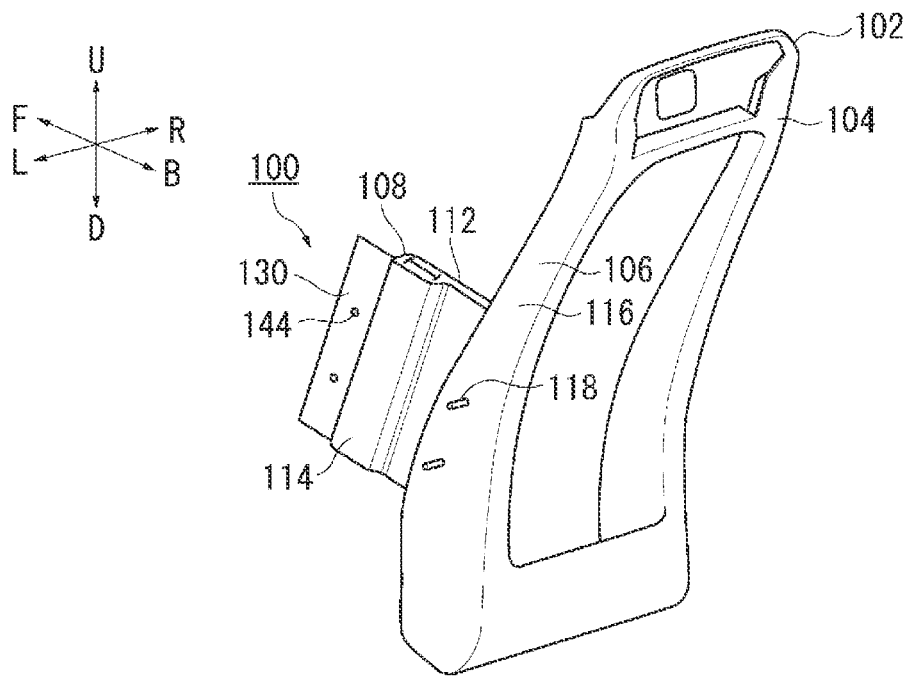

FIG. 2(b) is a diagram illustrating a state where the cover extension portion 130 of FIG. 2(a) is removed from the stud bolt 118. The cover extension portion 130 is provided with a bolt hole 144 corresponding to the stud bolt 118. The cover extension portion 130 can be easily fastened to the frame side plate part 116 by hooking a bolt hole 144 on the stud bolt 118 penetrating the frame side plate part 116.

Figure 3:
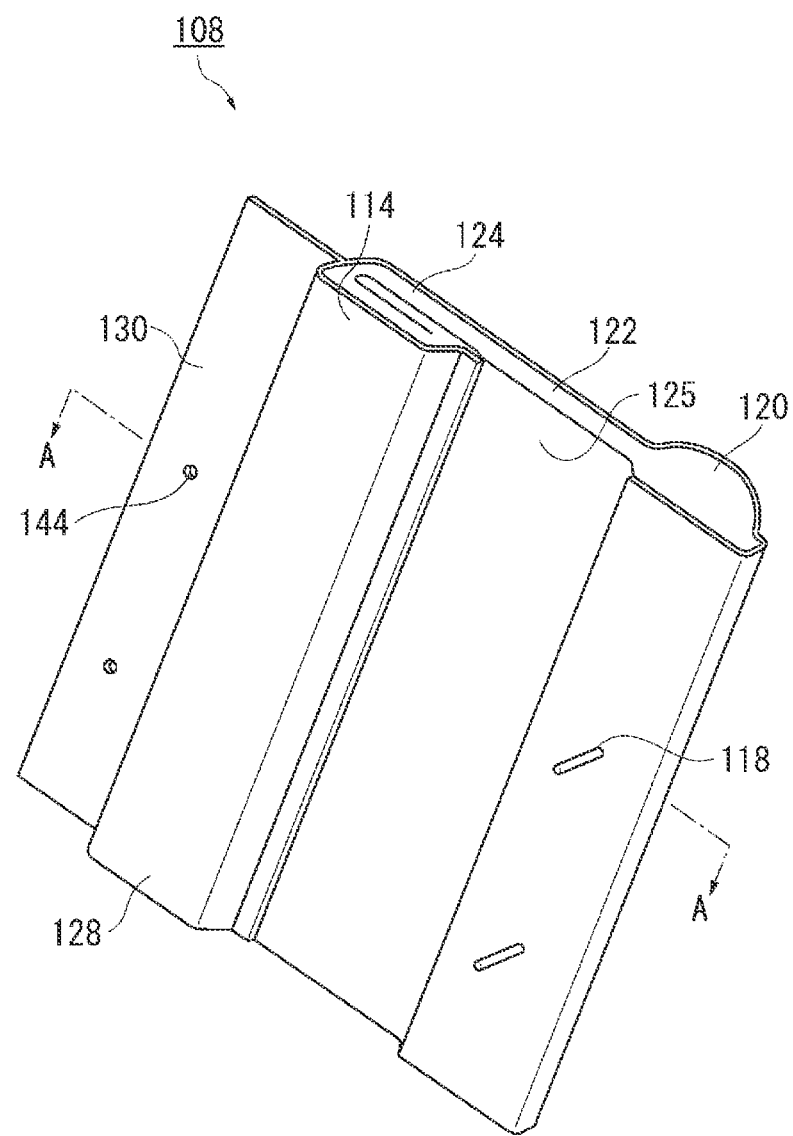
FIG. 3 is a diagram illustrating the airbag module in FIG. 2(b) by itself.

FIG. 3 is a diagram illustrating the airbag module 108 in FIG. 2(b) by itself. FIG. 3(a) is a perspective view of the airbag module 108 as viewed from the same direction as in FIG. 2(b). Regarding the positional relationship in stowed form when assembled onto the frame side plate part 116 (see FIG. 2(a)), the airbag cushion 112 can be separated into three sections, the cushion rear portion 120, a cushion folded portion 122, and a cushion front portion 124.

The cushion rear portion 120 is the portion of the airbag cushion 112 toward the rear of the vehicle upon expansion and deployment of the airbag cushion (see FIG. 1(a)), contains the inflator 110, and is positioned inside the frame side plate part 116 in the width direction when the airbag module 108 is assembled to the frame side plate part 116 (see FIG. 5(b)).

When the airbag module 108 is assembled to the frame side plate part 116, the cushion folded portion 122 extends from the cushion rear portion 120 over a front edge 126 of the frame side plate part 116 and is folded back on the outside of the frame side plate part 116. Here, a front surface 122a that is a ridge fold of the cushion folded portion 122 is formed at the front side as viewed from the seat 102 (see FIG. 1(a)) and a back surface 122b that is a valley folded side is formed at the rear side. The front-back direction indicated here is not the front-back direction of the vehicle but is the front-back direction as viewed from an occupant sitting normally on the seat 102 (see FIG. 1(a)). Therefore, the front direction seen from the occupant corresponds to the front side, the back direction of the occupant corresponds to the back side, the right hand direction corresponds to the right side, and the left hand direction corresponds to the left side.

The cushion front portion 124 is a portion towards the front side of the vehicle when the airbag cushion 112 expands and deploys, and prior to expansion and deployment, the cushion front portion 124 extends from the cushion folded portion 122 and is arranged outside the frame side plate part 116.

A cushion exposed portion 125 is a portion where the airbag cushion 112 is exposed from the cover member 114, and is formed at a predetermined position from the cushion rear portion 120 to the cushion front portion 124. When the airbag cushion 112 is assembled to the frame side plate part 116 (see FIG. 5(b)), the cushion exposed portion 125 is in direct contact with the frame side plate part 116 without passing through the cover member 114.

Figure 4A:
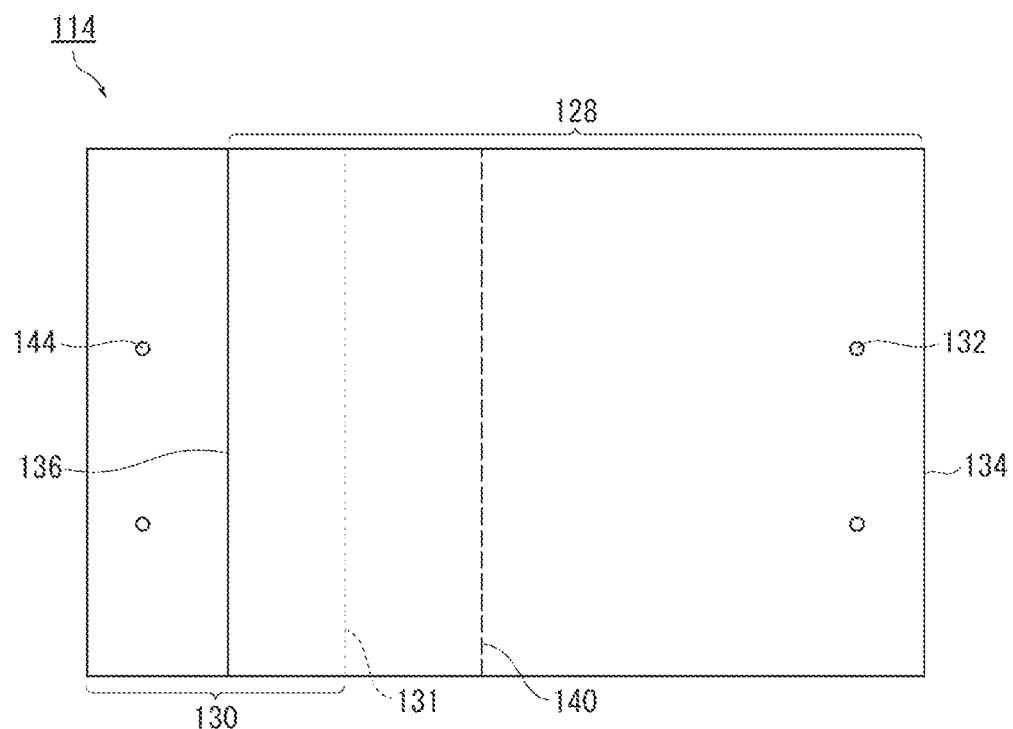
FIG. 4 is a diagram illustrating the cover member in FIG. 3.

FIG. 4 is a diagram illustrating the cover member 114 in FIG. 3. FIG. 4(a) illustrates a state in which the cover member 114 of FIG. 3 is spread out flat. The cover member 114 is formed of a non-woven fabric or the like, and is broadly divided into a large strip-shaped cover enveloping portion 128 and the small strip-shaped cover extension portion 130. In FIG. 4, the cover extension portion 130 is partially overlapped with the cover enveloping portion 128 on the inner side in the diagram.

Figure 4B:
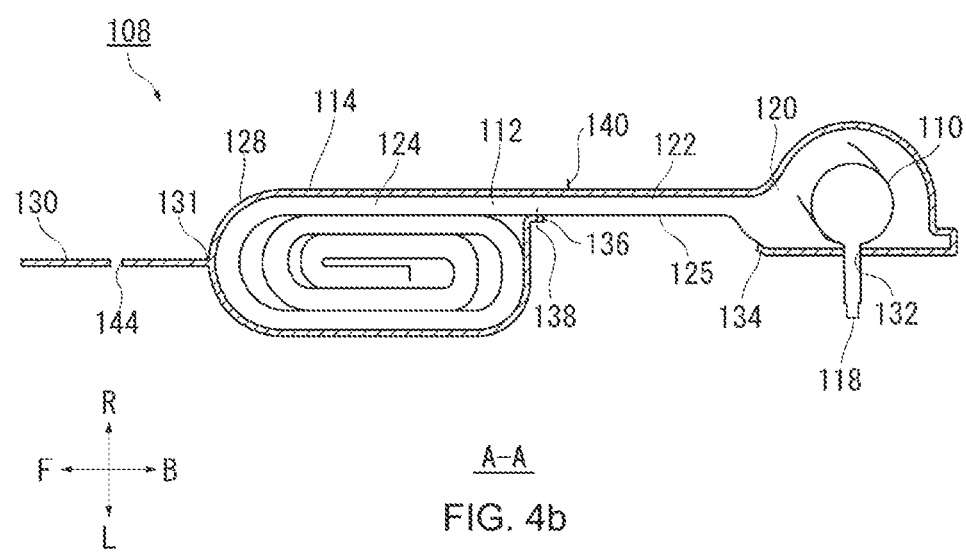

FIG. 4(b) is a cross-sectional view along A-A of the airbag module 108 in FIG. 3. The cover enveloping portion 128 has a bolt hole 132 (see FIG. 4(a)) on a first end portion 134 side, and the first end portion 134 side is engaged with the cushion rear portion 120 by the stud bolt 118. Furthermore, the cover enveloping portion 128 passes from the cushion rear portion 120 to the front side of the cushion folded portion 122 and over the front surface 122a, and then covers the outer periphery thereof from the outside to the inside in the width direction of the cushion front portion 124, and a second end portion 136 reaches the back surface 122b of the cushion folded portion 122 and is engaged with the back surface 112b by temporary stitches 138. The cover enveloping portion 128 can, in particular, suitably retain the rolled and folded state of the cushion front portion 124.

Here, as illustrated in FIG. 3, the cover enveloping portion 128 covers the airbag cushion 112 from top to bottom, the cushion rear portion 120, the cushion folded portion 122, and the cushion front portion 124. The cover enveloping portion 128 uniformly covers all locations of the airbag cushion 112 from top to bottom. Therefore, the load applied by the cover enveloping portion 128 on the airbag cushion 112 upon expansion and deployment thereof is also substantially uniform. This reduces expansion and deployment behavioral bias of the airbag cushion 112, thus stabilizing said behavior.

The cover member 114 has one or a plurality of weak portions on the cover enveloping portion 128 or the cover extension portion 130 that can be broken by expansion pressure of the airbag cushion 112. As illustrated in FIG. 4(a), in the present embodiment, the cover enveloping portion 128 is provided with a first weak portion 140. The first weak portion 140 can be achieved as, for example, a breaking line-shaped slit that vertically traverses the cover enveloping portion 128. When the first weak portion 140 is broken, the airbag cushion 112 is released from the envelope of the cover member 114 and expands and deploys to the side of the occupant. Note, in addition to the breaking line-shaped slit, the first weak portion 140 can also be achieved as a configuration of cuts arranged in an incision shape or an arrangement of small notches (through holes).

In the present embodiment, the temporary stitches 138 of the second end portion 136 of the cover enveloping portion 128 also functions as a second weak portion. The temporary stitches 138 are sewn in a temporarily fastened state with a thread that can be broken by expansion pressure enabling the connection to be undone by the expansion pressure of the airbag cushion 112.

FIG. 5 is a diagram illustrating a process of assembling the airbag module 108 in FIG. 4(b) to the frame side plate part 116. FIG. 5(a) is a diagram of a state in which the stud bolt 118 of the airbag module 108 of FIG. 4(b) passes through the frame side plate part 116. As described above, the cushion rear portion 120 equipped with the inflator 110 is assembled to the frame side plate part 116 on the inner side in the width direction of the seatback 104 (see FIG. 1(b)).

FIG. 5(b) is a diagram of a state in which the cushion folded portion 122 of FIG. 5(a) is folded back. FIG. 5(b) corresponds to the horizontal cross section of the airbag module 108 assembled to the frame side plate part 116 of FIG. 2(a). The cushion folded portion 122 of the airbag module 108 is folded over the front edge 126 of the frame side plate part 116 such that the cushion front portion 124 is located outside the frame side plate part 116 and the cover extension portion 130 is hooked and retained on the tip end of the stud bolt 118. Here, the cushion exposed portion 125 comes into direct contact with the frame side plate part 116. This completes the assembly of the airbag module 108 to the frame side plate part 116.

In a state where the airbag module 108 is assembled to the frame side plate part 116, the cover enveloping portion 128 of the cover member 114 covers from the cushion rear portion 120 on the inner side in the width direction of the seat 102 to the front of the cushion folded portion 122 and encircles from the outer side in the width direction of the cushion front portion 124 to the inner side in the width direction of the cushion front portion 124, enveloping the cushion front portion 124. The cover extension portion 130 is connected by a joint portion 131 to a portion of the cover enveloping portion 128 on the rear side of the region covering the cushion front portion 124 and is engaged on the stud bolt 118 that penetrates through the frame side plate part 116 and protrudes from the joint portion 131.

In the state where the airbag module 108 is assembled to the frame side plate part 116, within the cover enveloping portion 128, the first weak portion 140 is formed at a location covering the front surface 122a of the cushion folded portion 122 as a location positioned to the front of the airbag cushion 112 in stowed form. In addition, the temporary stitches 138, which are the second weak portion, engage the second end portion 136 of the cover enveloping portion 128 with the back surface 122b at the back side of the cushion folded portion 122.

Figure 6:
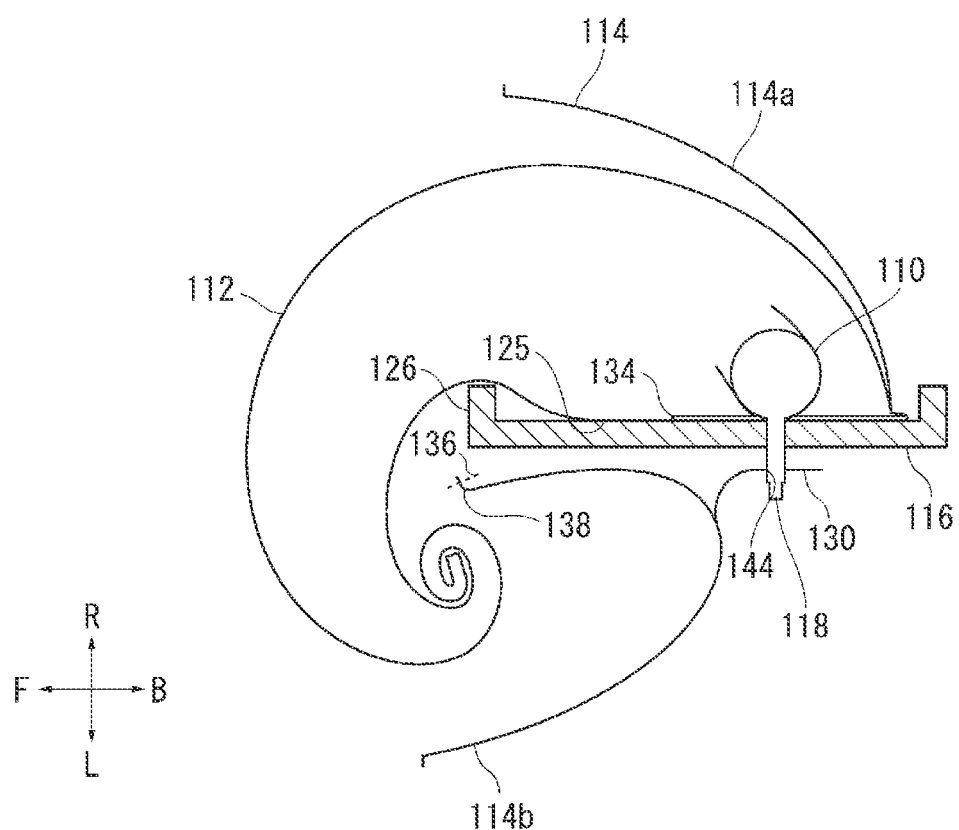
FIG. 6 illustrates an activated state of the airbag cushion of FIG. 5(b).

FIG. 6 illustrates an activated state of the airbag cushion 112 of FIG. 5(b). Upon detection of an impact by a vehicle sensor and supplying of gas from the inflator 110, the airbag cushion 112 expands and deploys, starting with the cushion rear portion 120 (FIG. 5(b)). The expansion pressure at this time breaks the cover member 114 first weak portion 140, releasing the airbag cushion 112.

The cushion rear portion 120 pushes on the side surface on the inner side of the frame side plate part 116 enabling the airbag cushion 112 to obtain an early reaction force from the frame side plate part 116 toward the occupant. Thus, the airbag cushion 112 can efficiently push aside the upholstery, seat pad, and the like of the seatback 104 (see FIG. 1(b)).

In particular, through the cushion exposed portion 125, the airbag cushion 112 in stowed form (see FIG. 5(b)) is in contact with the frame side plate part 116 prior to breaking of the cover member 114 first weak portion 140 or the like, in other words prior to expansion and deployment. The airbag cushion 112 quickly obtains a reaction force from the frame side plate part 116 toward the occupant side upon expansion and deployment through the cushion exposed portion 125. This achieves a push-back or so-called pre-push function of the occupant to the center of the seat 102 in the width direction before expansion and deployment of the airbag cushion 112 is fully complete enabling improving occupant restraining force.

When gas flows from the cushion rear portion 120 (see FIG. 5(b)) into the cushion folded portion 122, the folding of the cushion folded portion 122 is unfolded and thus expansion and deployment of the cushion front portion 124 proceeds toward the front of the vehicle. The expansion pressure at this time causes undoing of the temporary stitches 138, releasing the connection of the airbag cushion 112 to the frame side plate part 116 via the cover extension portion 130. Furthermore, the airbag cushion 112 utilizes the obtained reaction force from the frame side plate part 116 to quickly expand and deploy from the inside of the seatback 104 (see FIG. 1(b)) toward the side of the occupant.

As described above, the airbag cushion 112 is arranged on the inner side and the outer side of the frame side plate part 116 in the width direction of the seat 102. Therefore, with the configuration described above, the airbag cushion 112 can be stowed efficiently in the limited space inside the seatback 104. In addition, expansion and deployment of the airbag cushion 112 described above starts from the cushion rear portion 120 on the inner side of the frame side plate part 116. Thus a reaction force from the frame side plate part 116 toward the occupant side is quickly obtained improving restraining force of the occupant.

Furthermore, with the present embodiment, regarding the cover member 114 that retains the airbag cushion 112, the first weak portion 140 (see FIG. 5(b)) at the front of the cushion folded portion 122 and the temporary stitches 138 that are the second weak portion at the back of the cushion folded portion 122 break. Thus, as viewed from the frame side plate part 116, the cover member 114 is separated into a first portion 114a on the inner side of the seat 102 in the width direction and a second portion 114b on the outer side in the width direction. Thus, the cover member 114 suitably retains the airbag cushion 112 in a stowed state prior to activation of the airbag cushion 112 while smoothly releasing the airbag cushion 112 upon activation of the airbag cushion 112.

Note, the first weak portion 140 can be suitably provided not only at the front of the cushion folded portion 122 but also at a prescribed location from the first end portion 134 to the joint portion 131 of the cover enveloping portion 128. If the first weak portion 140 is provided within this range, the cover member 114 can suitably be separated into the first portion 114a and second portion 114b.

In addition, the description includes use of non-woven fabric as the material for the cover member 114 but the cover member 114 can be implemented using another material. For example, the cover member 114 can be implemented using the same material as the heat-welded fabric or the base fabric of the airbag cushion 112. Here, if heat-welded fabric is used as the material of the cover member 114, a single cover enveloping portion can be formed through heat welding the edges of a plurality of remnants. Here, the edges of the remnants will peel apart due to expansion pressure of the airbag cushion 112 so these edges can be used as the weak portion.

Modified Example

FIG. 7 is a diagram illustrating a first modified example (cover member 200) of the cover member 114 in FIG. 5(b). In the description below, the same code will be provided for configuration elements that have already been described and the description thereof omitted. In addition, configuration elements with the same name as configuration elements already described have the same configuration and function even if a different reference is applied.

Figure 7A:
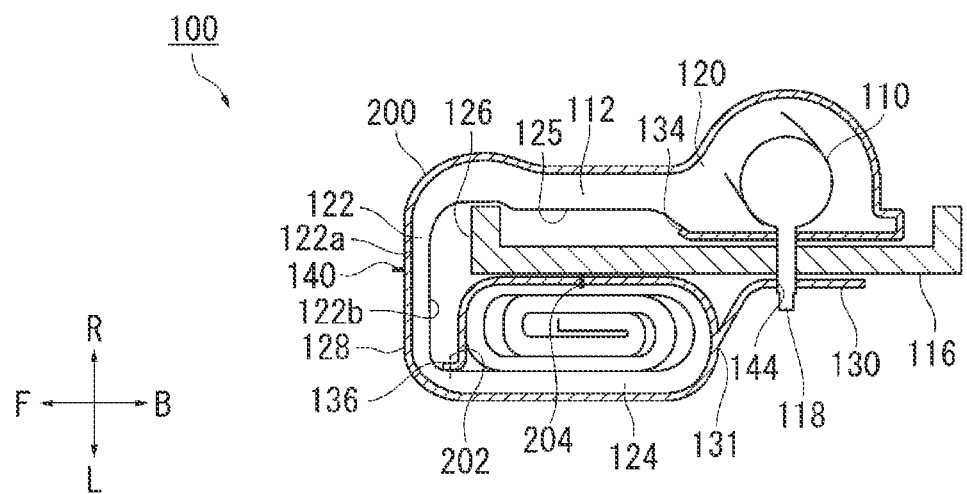
FIG. 7 is a diagram illustrating a first modified example of the cover member in FIG. 5(b).

FIG. 7(a) illustrates the cover member 200 corresponding to FIG. 5(b) before breaking. With the cover member 200, the second end portion 136 of the cover enveloping portion 128 is joined to the back surface 122b of the cushion folded portion 122 with unbreakable stitches 202. The joint of the second end portion 136 can be achieved through adhesion or the like in addition to stitches. Furthermore, a second weak portion 204 that is breakable by expansion pressure is formed in the portion of the cover enveloping portion 128 that covers the cushion front portion 124 on the inside in the width direction, in particular between the joint portion 131 of the cover extension portion 130 to the second end portion 136. The second weak portion 204 can also be implemented by means of a slit or the like similar to the first weak portion 140 (FIG. 4(a)).

Figure 7B:
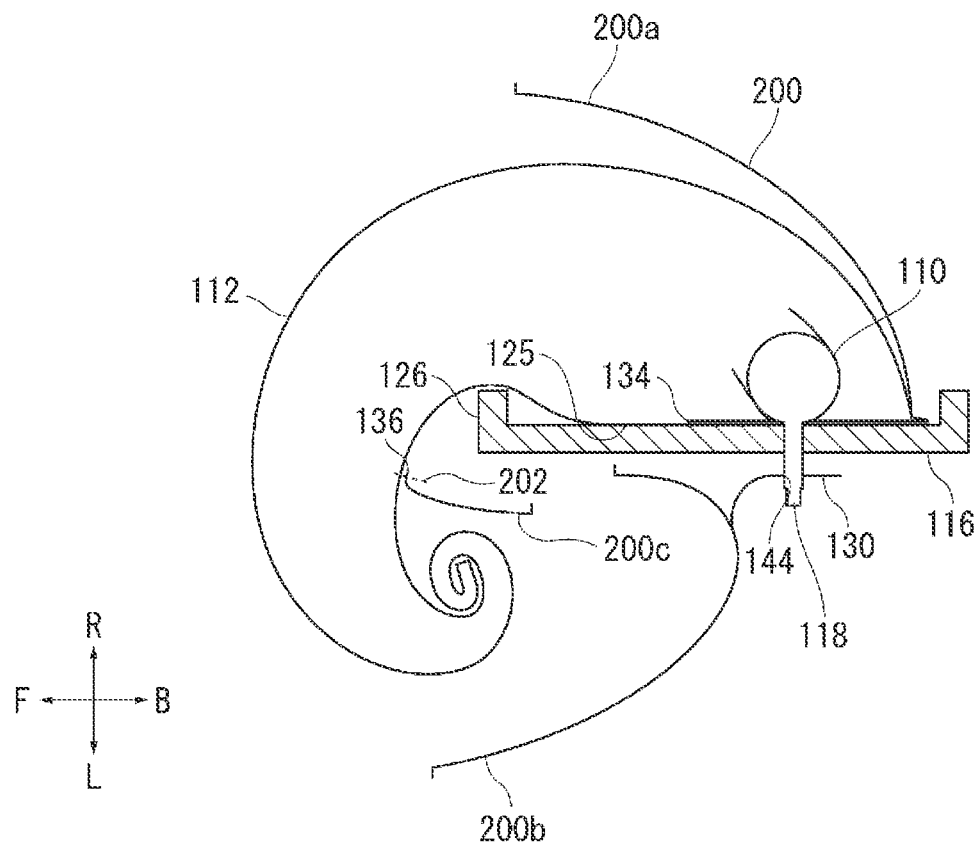

FIG. 7(b) illustrates the cover member 200 corresponding to FIG. 6 after breaking. The cover member 200 is separated into a first portion 200a on the inner side of the frame side plate part 116, a second portion 200b on the outer side of the frame side plate part 116, and further to a third portion 200c on the second end portion 136 side of the cover enveloping portion 128. In this manner, the cover member 200 can smoothly release the airbag cushion 112 through breaking of the first weak portion 140 (see FIG. 7(a)) and the second weak portion 204.

Figure 8A:
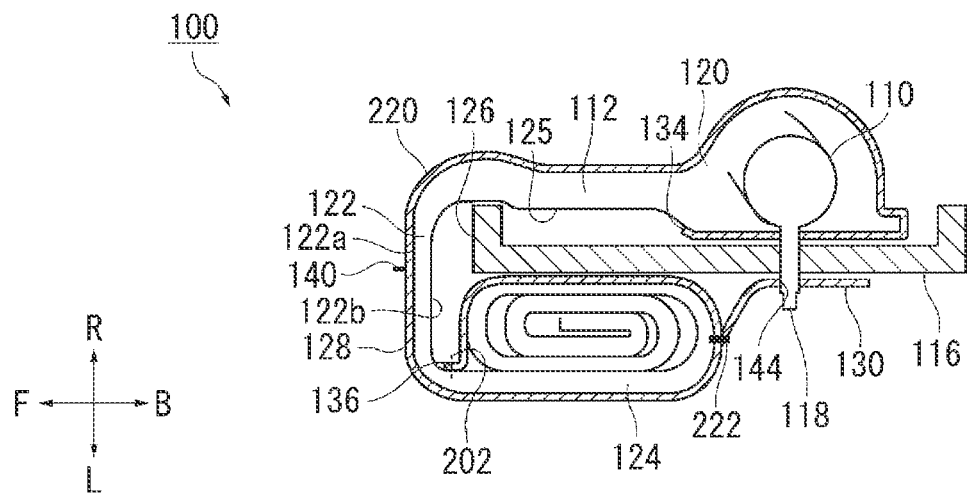
FIG. 8 is a diagram illustrating a second modified example of the cover member in FIG. 5(b).

FIG. 8 is a diagram illustrating a second modified example (cover member 220) of the cover member 114 in FIG. 5(b). FIG. 8(a) illustrates the cover member 220 corresponding to FIG. 5(b) before breaking. With the cover member 220, the first weak portion 140 and a first weak portion 222, as a joint portion connecting the cover enveloping portion 128 and the cover extension portion 130, are implemented as the first weak portion provided at a location in the region from the first end portion 134 to the cover extension portion 130 of the cover enveloping portion 128.

Figure 8B:
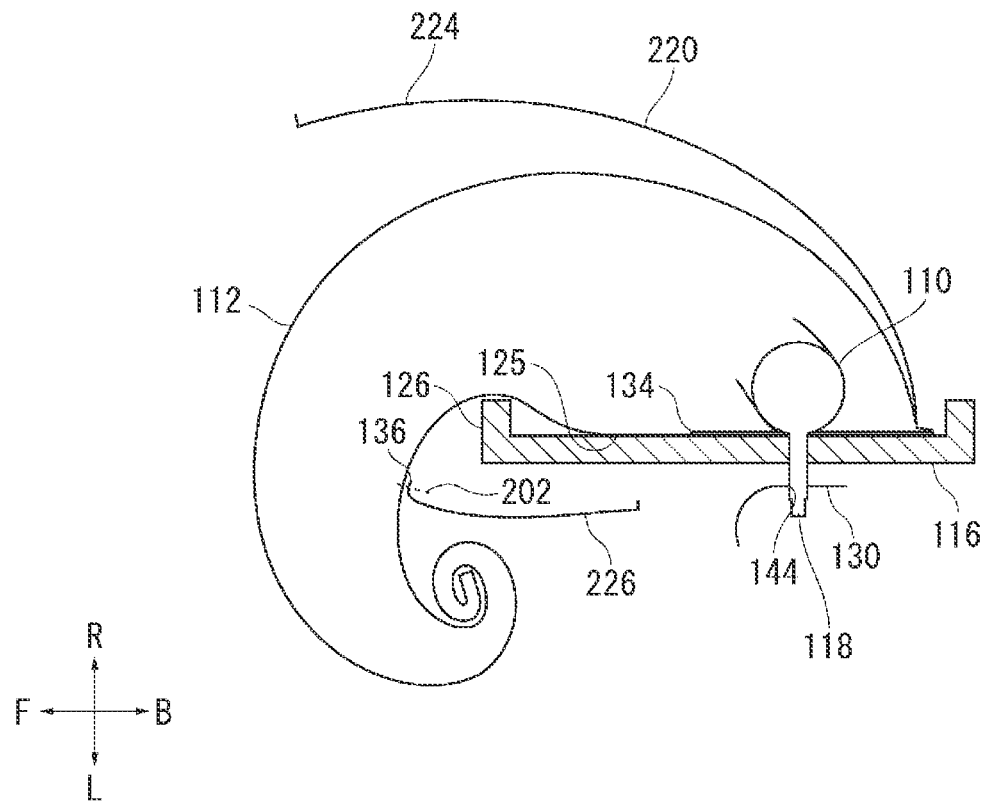

FIG. 8(b) illustrates the cover member 220 corresponding to FIG. 6 after breaking. Breaking of the first weak portion 222 separates the cover member 220 into a first portion 224 on the inner side of the frame side plate part 116 and a third portion 226 on the cover extension portion 130 and the cover enveloping portion 128 second end portion 136 sides. In this manner, with the first weak portion 222 of the cover member 220 breaking, the cover enveloping portion 128 (see FIG. 8(a)) separates from the cover extension portion 130, the cover enveloping portion 128 separates into two and smoothly releases the airbag cushion 112. This manner of first weak portion 222 can also be implemented by providing a slit or the like that can break near the joint portion of the cover extension portion 130 and the cover enveloping portion 128, in addition to temporarily stitching the cover extension portion 130 to the cover enveloping portion 128.

Figure 9A:
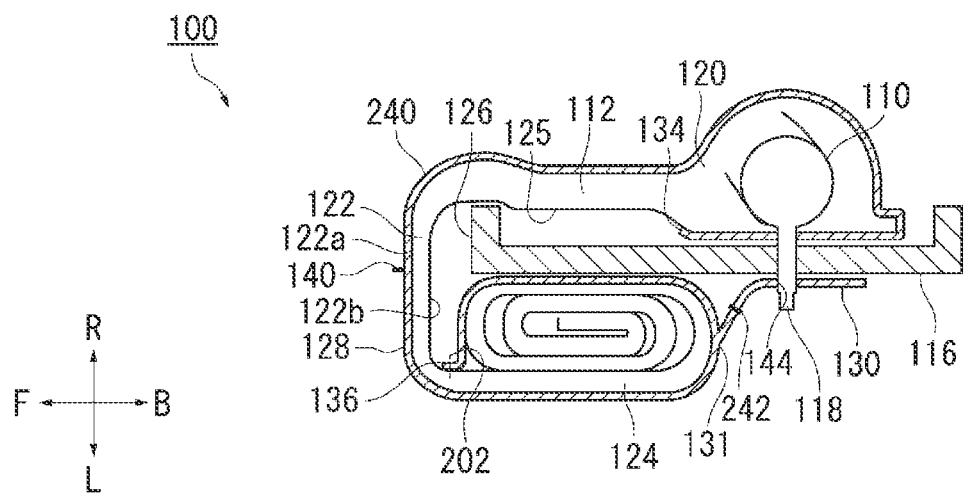
FIG. 9 is a diagram illustrating a third modified example of the cover member in FIG. 5(b).

FIG. 9 is a diagram illustrating a third modified example (cover member 240) of the cover member 114 in FIG. 5(b). FIG. 9(a) illustrates a cover member 240 corresponding to FIG. 5(b) before breaking. In addition to the first weak portion 140, the cover member 240 includes a third weak portion 242 as a weak portion of the cover extension portion 130. The third weak portion 242 breaks under expansion pressure and separates the cover enveloping portion 128 from the frame side plate part 116.

Figure 9B:
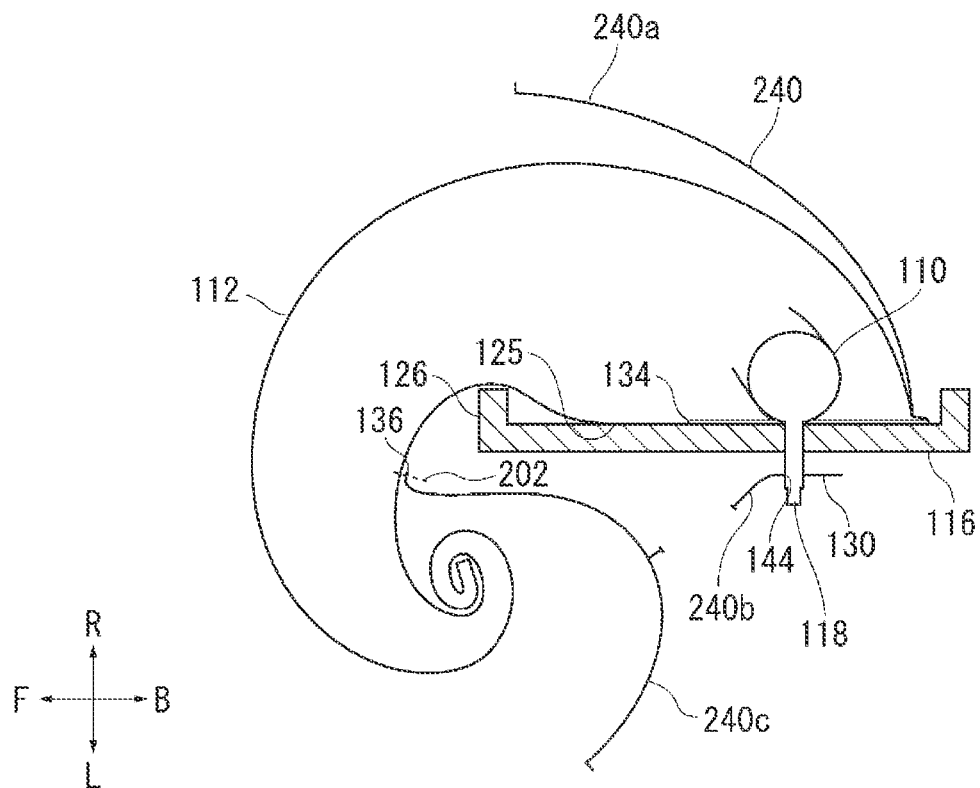

FIG. 9(b) illustrates the cover member 240 corresponding to FIG. 6 after breaking. The cover member 240 is separated into a first portion 240a on the inner side of the frame side plate part 116, a second portion 240b at the tip end of the cover extension portion 130, and a third portion 240c that encircles the cushion front portion 124 of the cover enveloping portion 128. In this manner, with the first weak portion 140 and third weak portion 242 of the cover member 240 breaking, the cover enveloping portion 128 separates from the cover extension portion 130 and the cover enveloping portion 128 is split enabling smooth release of the airbag cushion 112.

Thus, the cover member of various modified examples suitably retain the airbag cushion 112 in a stowed state prior to activation of the airbag cushion 112 while smoothly releasing the airbag cushion 112 upon activation of the airbag cushion 112.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in a side airbag device mounted on a vehicle.

Description of Codes

100: Side airbag device, 102: Seat, 104: Seatback, 106: Internal frame, 108: Airbag module, 110: Inflator, 112: Airbag cushion, 114: Cover member, 114a: First portion of cover member, 114b: Second portion of cover member, 116: Frame side plate part, 118: Stud bolts, 120: Cushion rear portion, 122: Cushion folded portion, 122a: Front surface of cushion folded portion, 122b: Back surface of cushion folded portion, 124: Cushion front portion, 125: Cushion exposed portion, 126: Front edge of frame side plate part, 128: Cover enveloping portion, 130: Cover extension portion, 131: Joint portion, 132: Bolt hole of cover enveloping portion, 134: Tip most part of cover enveloping portion, 136: Second end portion of cover enveloping portion, 138: Temporary stitches, 140: First weak portion, 144: Bolt hole of cover extension portion, 200: Cover member of first modified example, 200a: First portion of cover member, 200b: Second portion of cover member, 200c: Third portion of cover member, to 202: Stitches, 204: Second weak portion, 220: Cover member of second modified example, 222: First weak portion, 224: First portion of cover member, 226: Third portion of cover member, 240: Cover member of third modified example, 240a: First portion of cover member, 240b: Second portion of cover member, 240c: Third portion of cover member, 242: Third weak portion

The invention claimed is:

1. A side airbag device comprising:
   an airbag module assembled on the frame side plate part along the side surface of the seatback of the internal frame of a vehicle seat, wherein,
   the airbag module includes:
   an airbag cushion that is bag-shaped and can be assembled to the frame side plate part in a prescribed stowed form of being rolled or folded,
   an inflator inserted into a prescribed position of the airbag cushion in the stowed form, and
   a cover member that envelops a prescribed range of the airbag cushion in the stowed form and can be broken by expansion pressure of the airbag cushion;
   the airbag cushion in stowed form includes:
   a cushion rear portion that contains the inflator and is assembled on the inside in the width direction of the seatback of the frame side plate part,
   a cushion folded portion that extends from the cushion rear portion and is folded over the front edge of the frame side plate part and back to the outside of the frame side plate part, and
   a cushion front portion extending from the cushion folded portion and arranged outside the frame side plate part; and
   the cover member on the horizontal cross-section of the airbag module assembled to the frame side plate part includes:
   a cover enveloping portion with a first end portion engaged to the cushion rear portion covering from the inner side in the width direction of this cushion rear portion over the front surface of the cushion folded portion and to the periphery in the width direction of the cushion front portion, and a second end portion reaching the back surface of the cushion folded portion and engaged with this back surface;
   a cover extension portion connected to a region of the cover enveloping portion that covers the cushion front portion by means of a prescribed joint portion, protrudes from this joint portion, and is engaged with the frame side plate part; and
   one or a plurality of weak portions provided on the cover enveloping portion or cover extension portion and can be broken by expansion pressure.

2. The side airbag device according to claim 1, wherein the one or a plurality of weak portions include a first weak portion provided in a region between a first end portion of the cover enveloping portion and the joint portion.

3. The side airbag device according to claim 2, wherein the first weak portion is provided near the joint portion.

4. The side airbag device according to claim 2, wherein the first weak portion is provided at a position located on the front side of the airbag cushion in stowed form when the airbag module is assembled to the frame side plate part.

5. The side airbag device according to claim 2, wherein the one or a plurality of weak portions include a second weak portion provided in a region between the joint portion and the second end portion of the cover enveloping portion.

6. The side airbag device according to claim 3, wherein the one or a plurality of weak portions include a second weak portion provided in a region between the joint portion and the second end portion of the cover enveloping portion.

7. The side airbag device according to claim 4, wherein the one or a plurality of weak portions include a second weak portion provided in a region between the joint portion and the second end portion of the cover enveloping portion.

8. The side airbag device according to claim 5, wherein the second weak portion is formed by means of temporary stitching of the second end portion of the cover enveloping portion to the back surface of the cushion folded portion that can be opened by expansion pressure.

9. The side airbag device according to claim 6, wherein the second weak portion is formed by means of temporary stitching of the second end portion of the cover enveloping portion to the back surface of the cushion folded portion that can be opened by expansion pressure.

10. The side airbag device according to claim 7, wherein the second weak portion is formed by means of temporary stitching of the second end portion of the cover enveloping portion to the back surface of the cushion folded portion that can be opened by expansion pressure.

11. The side airbag device according to claim 5, wherein the second end portion of the cover enveloping portion is joined to the back surface of the cushion folded portion.

12. The side airbag device according to claim 6, wherein the second end portion of the cover enveloping portion is joined to the back surface of the cushion folded portion.

13. The side airbag device according to claim 7, wherein the second end portion of the cover enveloping portion is joined to the back surface of the cushion folded portion.

14. The side airbag device according to claim 2, wherein the one or a plurality of weak portions include a third weak portion that is formed on the cover extension portion and upon breaking from expansion pressure, separates the cover enveloping portion from the frame side plate part.

15. The side airbag device according to claim 1, wherein the cover extension portion is hooked on a stud bolt of the inflator penetrating the frame side plate part.

16. The side airbag device according to claim 1, wherein the airbag cushion in stowed form further includes a cushion exposed portion that is formed at a prescribed location from the cushion rear portion to the cushion front portion, is exposed through the cover member, and is in contact with the frame side plate part.

17. The side airbag device according to claim 1, wherein the cover enveloping portion covers the entire airbag cushion from top to bottom, the cushion rear portion, the cushion folded portion, and the cushion front portion.

* * * * *